US012617534B2

(12) United States Patent
Bell et al.

(10) Patent No.: US 12,617,534 B2
(45) Date of Patent: May 5, 2026

(54) MODULAR SEAT CONTROL SYSTEM

(71) Applicant: Textron Innovations Inc., Providence, RI (US)

(72) Inventors: Joshua Lawrence Bell, Whichita, KS (US); Matthew William Reese, Whichita, KS (US)

(73) Assignee: Textron Innovations Inc, Providence, RI (US)

( * ) Notice: Subject to any disclaimer, the term of this patent is extended or adjusted under 35 U.S.C. 154(b) by 187 days.

(21) Appl. No.: 18/360,547

(22) Filed: Jul. 27, 2023

(65) Prior Publication Data

US 2025/0033776 A1　　Jan. 30, 2025

(51) Int. Cl.
　　*B64D 11/06* 　　(2006.01)
　　*B64C 19/00* 　　(2006.01)

(52) U.S. Cl.
　　CPC .......... *B64D 11/0626* (2014.12); *B64C 19/00* (2013.01); *B64D 11/064* (2014.12); *B64D 11/0643* (2014.12)

(58) Field of Classification Search
　　CPC .................................................. B64D 11/0626
　　USPC ......................................................... 710/305
　　See application file for complete search history.

(56) References Cited

U.S. PATENT DOCUMENTS

| | | | | |
|---|---|---|---|---|
| 6,530,842 | B1 * | 3/2003 | Wells ...................... | G07F 17/32 463/16 |
| 2005/0067866 | A1 * | 3/2005 | Luong ...................... | A47C 1/11 297/217.3 |

| | | | | |
|---|---|---|---|---|
| 2008/0072509 | A1 * | 3/2008 | Eberhardt ........... | G07F 17/0014 297/217.3 |
| 2008/0185888 | A1 * | 8/2008 | Beall ...................... | A47C 7/727 705/14.69 |
| 2011/0043006 | A1 * | 2/2011 | Butt ........................ | A47C 7/723 297/217.3 |
| 2011/0060506 | A1 * | 3/2011 | Harden ................ | B60N 2/0264 701/49 |
| 2014/0068286 | A1 * | 3/2014 | Nguyen .................. | G06F 1/181 361/679.08 |
| 2014/0300147 | A1 * | 10/2014 | Suhre ..................... | B64D 11/06 297/391 |
| 2018/0352959 | A1 * | 12/2018 | Zhang ...................... | A47C 1/03 |
| 2020/0241683 | A1 * | 7/2020 | Le ....................... | A61H 15/0078 |
| 2022/0055751 | A1 * | 2/2022 | Hansson ............ | B64D 11/0624 |

FOREIGN PATENT DOCUMENTS

| | | | | |
|---|---|---|---|---|
| EP | 2614003 B1 * | 4/2016 | ............. | A47C 1/024 |

* cited by examiner

*Primary Examiner* — Titus Wong
(74) *Attorney, Agent, or Firm* — Slater Matsil, LLP

(57) ABSTRACT

An embodiment seat control system includes a control board having a processing unit, wherein the processing unit has one or more processors and one or more memories, and a mainboard. The processing unit is communicatively attached to the mainboard and mainboard has a plurality of receptacles and mainboard includes one or more communication buses between at least one of the plurality of receptacles and the processing unit. The system further has one or more system modules, where each module of the one or more system modules is configured to be connected to a respective receptacle of the plurality of receptacles, where each module of the one or more system modules implements a functional capability of a seat, and where the one or more system modules are nondestructively removeable from the mainboard.

20 Claims, 10 Drawing Sheets

MODULAR SEAT CONTROL SYSTEM

TECHNICAL FIELD

The present invention relates generally to an improved system and method for controlling the subsystems in a seat, and, in particular embodiments, to a modular electronic system for unified control and actuation for a seat in, for example, an aircraft cabin.

BACKGROUND

Generally, each element of, for example, an aircraft cabin seat utilizes separate controllers for each subsystem. For example, a seat a control mechanism for a recline release is separate from a seat control mechanism for the inboard/outboard tracking systems of the seat. This results in increased failure potentials for the seat, increased component weight and costs, increased maintenance requirements, and increased costs over the life of the platform when compared to seats utilizing a unified architecture. Further, some systems rely on mechanical linkages, which are difficult to operate and unable to be adjusted over the life of the seat to account for changing tolerances based on wear and tear.

Additionally, the size of the average passenger has increased over time, and airline travel has become more commonplace, resulting in a need to allow for increased weight requirements for travelers. Reducing the weight of the systems of the aircraft permits more weight can be apportioned to travelers, accommodating more travelers or heavier travelers.

SUMMARY

In accordance with a preferred embodiment of the present invention, an improved modular electronic system for unified control and actuation for a seat comprises as follows.

An embodiment seat control system includes a control board having a processing unit, wherein the processing unit has one or more processors and one or more memories, and a mainboard. The processing unit is communicatively attached to the mainboard and mainboard has a plurality of receptacles and mainboard includes one or more communication buses between at least one of the plurality of receptacles and the processing unit. The system further has one or more system modules, where each module of the one or more system modules is configured to be connected to a respective receptacle of the plurality of receptacles, where each module of the one or more system modules implements a functional capability of a seat, and where the one or more system modules are nondestructively removeable from the mainboard.

An embodiment seat includes a seat having armrests, a control board disposed in a first armrest of the armrests, the control board having a processing unit that includes one or more processors, at least one communication bus, and one or more memories, a mainboard, where the processing unit is communicatively attached to the mainboard, and the mainboard has a plurality of receptacles, and one or more system modules. Each module of the one or more system modules is disposed a respective receptacle of the plurality of receptacles, each system module of the one or more system modules implements a functional capability of a seat, each system module of the one or more system modules is configured to communicate over the communications bus with the processing unit, and the one or more system modules are non-destructively removeable from the mainboard. The system further has a power supply configured to supply power to the processing unit and to systems of the seat related to the one or more system modules.

An embodiment seat control system includes a control board, having a processing unit having one or more processors, at least one communication bus, and one or more non-transitory computer readable memories storing program code for controlling a plurality of system modules installed in a seat to cause each system module of the system module to provide a functional capability of the seat, and a mainboard, where the processing unit is communicatively attached to the mainboard, and where the mainboard is configured to enable the processing unit to communicate with each system modules of the plurality of system modules. The seat control system further has the plurality of system modules, where each system module of the plurality of system modules is removably connected to, and in signal communication with, the mainboard, and where each system module is configured to provide a functional capability of the seat under of the processing unit, and a voltage regulator, connected to the mainboard, where the program code for controlling a plurality of system modules includes instructions that, when executed by the processor, cause the processor to control the voltage regulator to selectively control power to at least one system module of the plurality of system modules.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
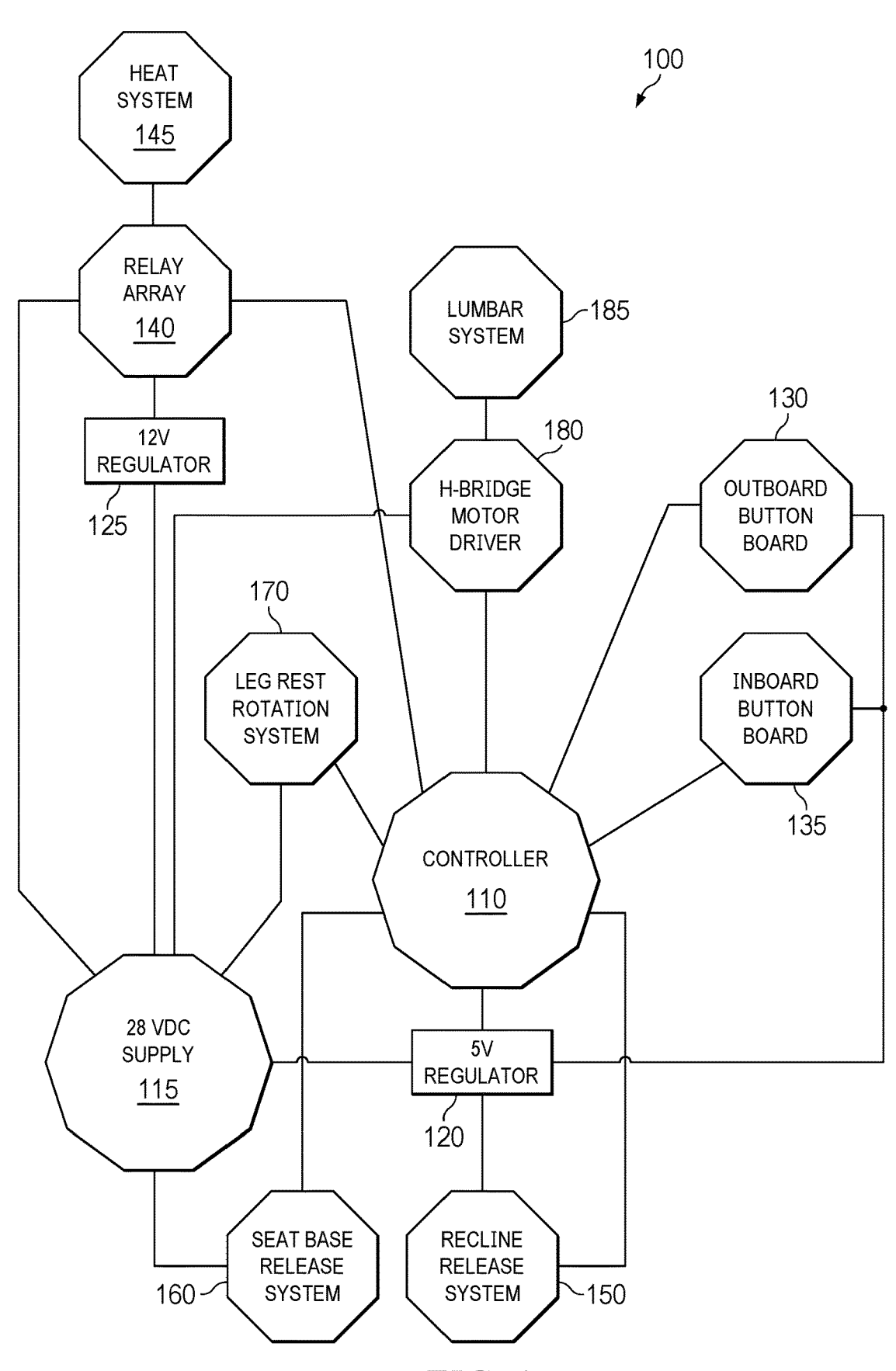
FIG. 1 is a block diagram of a modular electronic system for unified control and actuation for a seat according to some embodiments.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Embodiments of the presented principles are directed toward an improved modular electronic system for unified control and actuation system for a seat used in, for example, an aircraft. The system provides high-quality parts that can be customized, resulting in greater freedom of design in the style, location, and function of the actuation and control systems for a seat.

Certain embodiments of the disclosure are discussed within the context of aircraft seating. However, it will be understood that the disclosure is not limited to only aircraft seating, and may find uses in watercraft, automobile, or other passenger vehicle seating as well. It will also be understood that the embodiments disclosed herein may be used with any aircraft, including fixed wing, rotorcraft, commercial, military, or civilian aircraft. Embodiments of the present disclosure are not limited to any particular setting or application, and embodiments can be used in any setting or application such as with other aircraft, vehicles, or equipment.

Presented herein are control systems for seating electrical modules that can be centrally located for ease of maintenance and construction. Further, elements of a seat control system are modular, such that individual subsystems of the seat, such as heating, recline, inboard/outboard tracking, swivel, lumbar, and the like, can be customized based on purchaser desires without having to individually customize the entire seat. In the event new subsystems are desired, modular components can be added with ease, and without having to redesign the entire seat. The modular nature of the system permits a same control system to be populated with the appropriate modules for a specified seat and provide a compatible platform for future systems. Cost and weight savings are further achieved through a reduction in parts.

The modular seat control system has of a mainboard with receptacles for additional modules that are all housed in the seat and accessed through the armrest of the seat. A seat, or a group of seats, has, at a minimum, the mainboard or system backbone. When options of the seat have been identified, the appropriate modules may be connected to the main board. The system will then recognize the module and make the feature functional on the seat once all requisite hardware has been installed. Should the need for diagnostics arise, a magnetic armrest cover can be removed to easily access diagnostic features. Furthermore, the location in the armrest allows the system to be fully removed if necessary by removing a minimum number of bolts, allowing for in-place repair. Thus, the system permits simple upgrades, future compatibility, and easy maintenance, while lowering part count and total weight.

FIG. 1 is a block diagram of a modular electronic system 100 for unified control and actuation system for a seat according to some embodiments. The system 100 has one or more central controllers 110 responsible for managing and operating all seat systems. In some embodiments, the controller 110 may have a processor and a non-transitory computer readable memory with one or more computer programs, software, or instructions for recognizing, managing, and controlling one or more seat systems. Additionally, the controller 110 may have a processor and a non-transitory computer readable memory with a single computer program, software, or set of instructions with provisions for handling all system modules that may be connected to the system, and the computer program may be updated to account for new modules. In other embodiments, the controller 110 may be a centralized system that controls seat systems for multiple seats, or may be a dedicated circuit such as an application specific integrated circuit (ASIC) with circuitry for controlling the seat systems, or such as a field programmable gate array (FPGA), or the like. For example, the controller may be a microcontroller such as an ATMEGA family microcontroller, an Arduino family microcontroller, Beagleboard system, 8052 or 8088 based microcontroller system, or the like.

In some embodiments, the system 100 has one or more interface systems such as an inboard button unit 130, outboard button unit 135, or the like, and may have one or more seat systems such as heat system 145, recline release system 150, seat base release system 160, leg rest system 170, a lumbar system 185, or the like. A DC power supply 115, such as ship-side power supply, provides power to the controller 110 and the individual systems of the seat. In some embodiments, the system 100 may also have one or more voltage regulators such as a 5V DC voltage regulator 120, a 12V DC voltage regulator 125, or the like. The voltage regulators 120, 125 may be provided for one or more particular seat systems depending on the voltage requirements of elements of the respective seat system. Additionally, the system 100 may include additional elements used to control or regulate systems connected to the controller 110. For example, a motor controller, such as an H-bridge motor controller 180, may be provided to control a DC motor according to commands from the controller 110. Additionally, other motors, such as brushless DC (BLDC) motors, may be used in system modules, and the system may have a brushless motor controller, or may have connections to provide power and/or commands to a brushless motor controller.

In some embodiments, the DC power supply 115 may be a 28V DC voltage supply. The voltage supply may be powered from a main bus (not shown) of the platform in which the seat is located, such as an aircraft main power bus. The main power bus voltage may be stepped down to a suitable voltage for the seat system components by one or more step-down voltage regulators. The power supply may have a battery backup, either internal or external, to facilitate power to the seat while the aircraft power generation systems are offline.

Figure 2A:
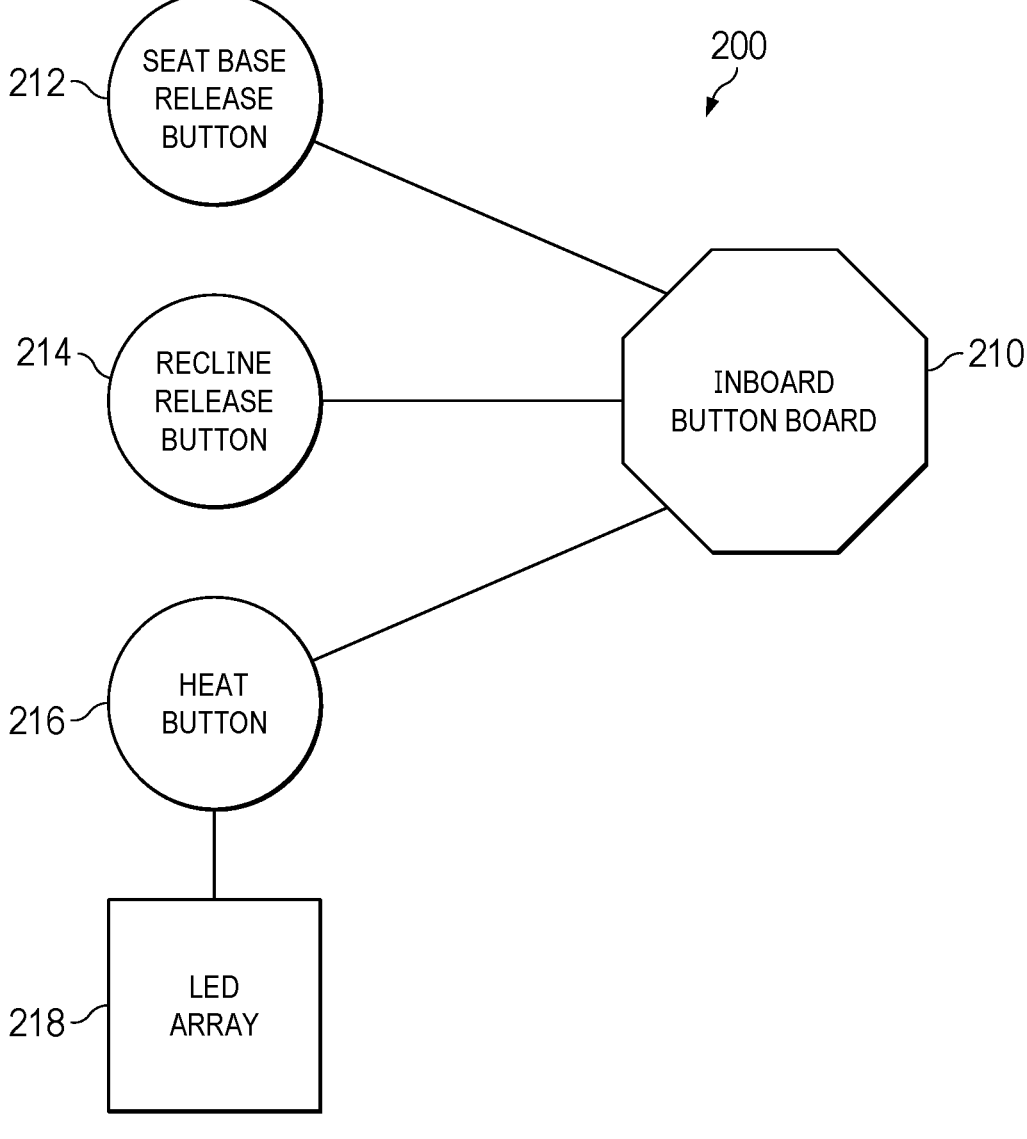
FIGS. 2A-E are block diagrams of individual seat subsystems according to some embodiments.
Figure 2B:
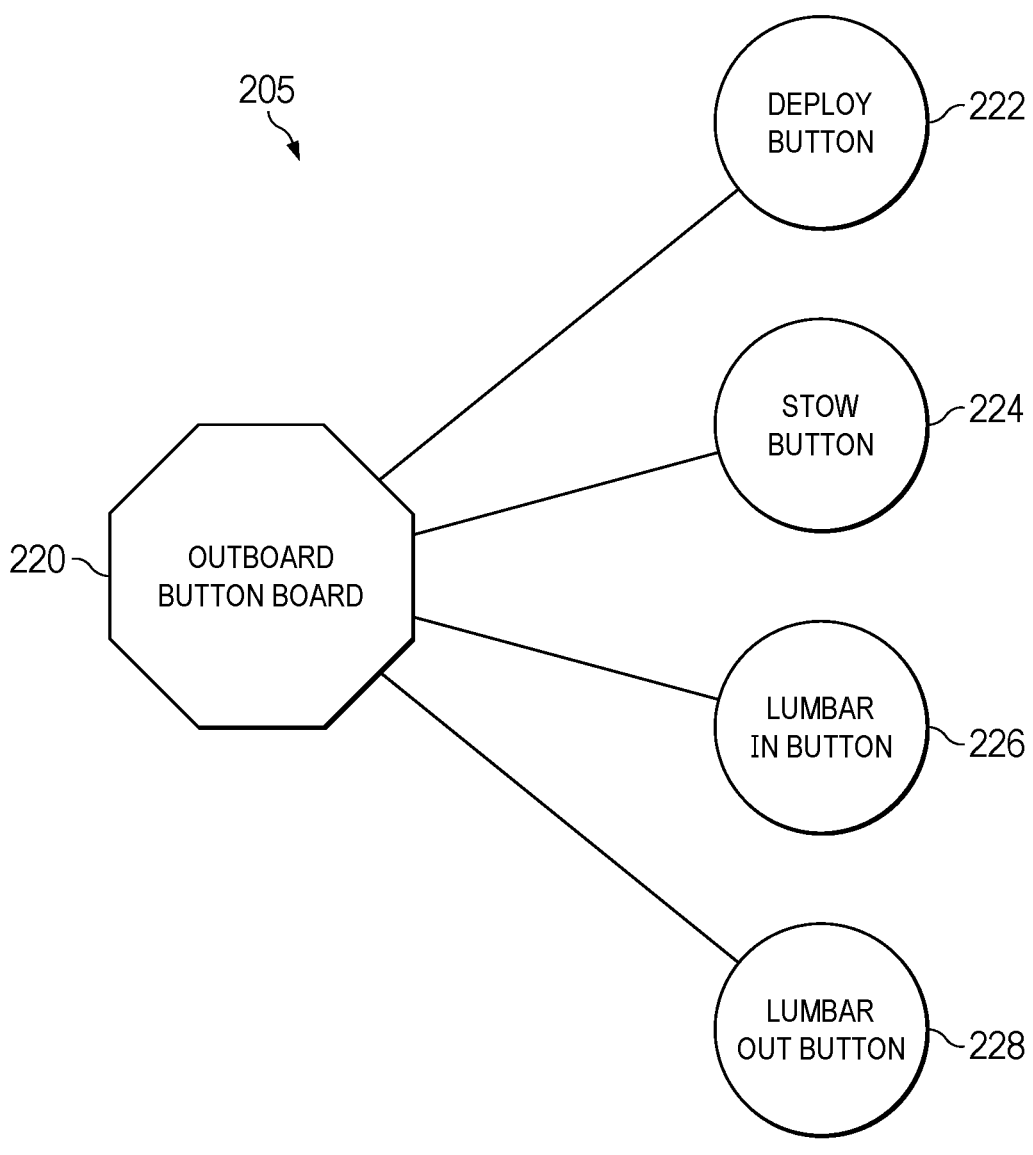

FIGS. 2A-E are block diagrams of various subsystems of a seat according to some embodiments. FIG. 2A is a block diagram of an interface system inboard button unit 200. FIG. 2B is a block diagram of an interface system outboard button unit 205. The inboard button unit 200 and outboard button unit 205 may be interface systems that permit a user to provide input to the controller for controlling different seat systems. While the inboard button unit 200 and outboard button unit 205 are shown as being embodiments of an interface system, the interface systems are not limited to such an arrangement, as then interface systems such as touch screens, mechanical systems such as switched or levers, centralized systems, remotely controlled systems, such as wireless control modules that interact with mobile applications, or the like, may be used to provide an interface for input to the system controller. In some embodiments the inboard button unit 200 and outboard button unit 205 may be disposed in an armrest of a seat having the controller and seat systems. For example, the inboard button unit 200 may be disposed on an inner side of inboard side of an armrest, and the outboard button unit 205 may be disposed on an inner side of an outboard armrest. In some embodiments, the inboard button unit 200 and outboard button unit 205 may have a same shape or footprint as each other, or may have different shapes. The button arrangement of each of the inboard button unit 200 and the outboard button unit 205 may be dictated by, or associated with, the system modules that will be installed on each seat, or with one or more features or controls being provided by the system. The inboard button unit 200 may use a standard footprint or base structure, regardless of the button layout or interface design, so that any inboard button unit 200 will integrate with the inboard armrest. Similarly, the outboard button unit 205 will may use a standard footprint or base structure, regardless of the button layout or interface design, so that any outboard button unit 200 will integrate with the outboard armrest.

In some embodiments, the inboard button unit 200 includes an inboard button board 210, and one or more control buttons associated with installed seat systems. For example, the inboard button unit 200 may include control buttons such as a seat base release button 212, a recline release button 214, and a heat button 216 with an associated LED array 218. The outboard button unit 205 includes an outboard button board 220 and one or more control buttons associated with installed seat systems. For example, the outboard button unit 205 may include control buttons such as a deploy button 222, a stow button 224, a lumbar in button 226, and a lumbar out button 228. The deploy button 222 and stow button 224 are related to the leg rest system 170, with the deploy button 222 operable to cause a leg rest to extend for use. The stow button 224 causes a leg rest to retract or stow under the seat when not in use, or for takeoff and landing. Each of the buttons in the inboard button unit 200 and outboard button unit 205 may additionally include visual signaling information. For example, the LED array 218 may be related to the heat button 216, and may be used to provide visual feedback of the level of applied heat selected by the seat occupant.

In some embodiments, each button in the inboard button unit 200 and outboard button unit 205 includes an electrical switch, momentary button, other electrical connection apparatus. An electrical signal is transmitted from individual buttons through electrical control cabling to the controller 110. The controller 110 may be in communication with the inboard button unit 200 and outboard button unit 205 via a communication protocol or discrete signals. In some embodiments the controller 110 may be connected to the inboard button unit 200 and outboard button unit 205 such that a voltage sensing signal is transmitted from the controller 110, to each of the inboard button unit 200 and outboard button unit 205. Each button in the inboard button unit 200 and outboard button unit 205 may individually pass back the voltage sense signal to the controller 110 or not based on the activation or state of the individual button, for example, to indicate whether the respective button is depressed or release/not depressed.

For example, in some embodiments, a sense voltage may be applied through cabling by the controller 110 to a first side of a switch of the recline release button 214. When the recline release button 214 is in an unpressed state, the switch in the recline release button 214 may be in a normally-open state such that the sense voltage received from the controller 110 by the recline release button 214 is blocked or not transmitted back to the controller 110. When the recline release button 214 is in a depressed state, meaning that a seat occupant is attempting to actuate the seat recline release, the switch in the recline release button 214 may be closed such that the sense voltage received from the controller 110 by the recline release button 214 is then transmitted back to the controller 110, signaling to the controller 110 that the recline release button 214 has been depressed.

Alternatively, in other embodiments, the switch in the recline release button 214 may be a normally-closed switch such that a sense voltage applied to the recline release button 214 by the controller 110 is transmitted back to the controller 110 when the recline release button 214 is in an unpressed state, and interrupted when the recline release button 214 is in a depressed state.

In some embodiments, the signaling between the inboard button unit 200 and the controller 110, and between the outboard button unit 205 and the controller 110, may be based on a wired or wireless (such as Bluetooth, Wi-Fi, Zigbee, or the like) signaling protocol. In cases where a wireless signaling protocol is used, each of the inboard button unit 200 and outboard button unit 205 may further include a wireless communication device, and may receive power from one or more of the power supplies such as the 28V DC power supply 115, the 12V DC voltage regulator 125, or the 5V DC voltage regulator 120 shown in FIG. 1. In cases where a wired or wireless communication protocol is used, each of the inboard button unit 200 and outboard button unit 205 may further include a processor, a logic array, a microprocessor, or the like, and may also receive power from one or more of the power supplies such as the 28V DC power supply 115, the 12V DC voltage regulator 125, or the 5V DC voltage regulator 120 shown in FIG. 1.

Figure 2C:
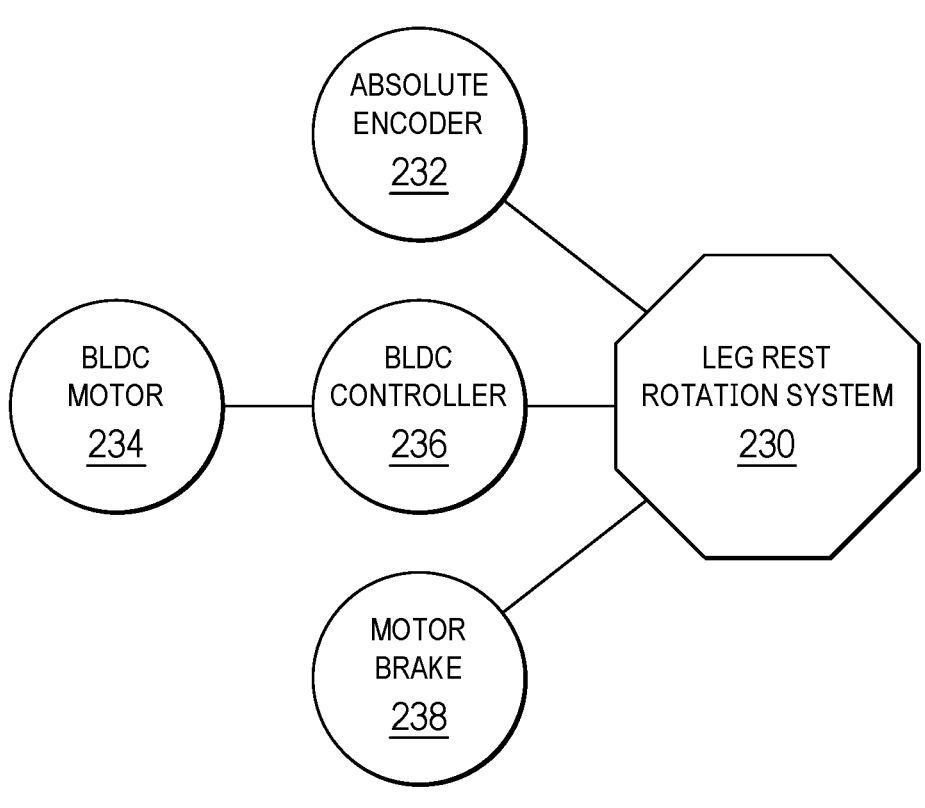

FIG. 2C is a block diagram of a leg rest rotation system 230 according to some embodiments. A leg rest rotation system 230 may include an absolute encoder 232, a leg rest DC motor such as a brushless DC (BLDC) motor 234, a BLDC controller 236, and a motor brake 238. The BLDC motor 234 may be used to raise and lower a leg rest structure, and the BLDC motor 234 may drive the leg rest structure under control of the BLDC controller, which may receive commands from a system controller in the leg rest rotation system 230. In some embodiments, the motor brake 238 may be a circuit or device that absorbs or dissipates motor energy, or holds a motor stationary when not in use. For example, the motor brake may apply a holding voltage to a brushless motor of a leg rest rotation system 230 to prevent back driving of the motor in a leg rest system, and maintain the leg rest position. Thus, the motor brake may be active when the motor is not actively moving the leg rest, or may be active when the leg rest is extended and not moving. In other embodiments, the motor brake 238 may be, for example, a dynamic brushless motor brake that routes current from the BLDC Motor to a resistor or other energy sink, to slow the BLDC motor 234 in a controlled fashion. The absolute encoder may be attached to the BLDC motor, or to a part of the leg rest structure to provide the system controller of the leg rest rotation system 230 with information on the position or speed of the leg rest so that the controller can command the BLDC motor 234 to accurately position the leg rest structure. A lumbar system 185 may operate in a substantially similar manner as the leg rest system 170, and in some embodiments, may use an H-bridge motor driver to control a motor of the lumbar system 185.

Figure 2D:
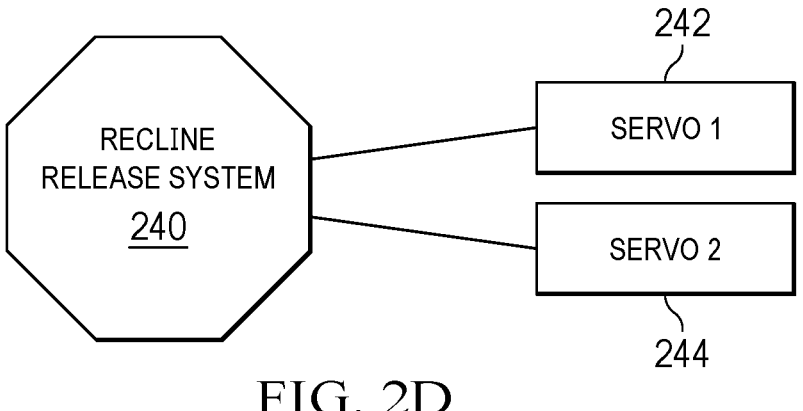

FIG. 2D is a bock diagram of a recline release system 240. According to some embodiments, the controller may send actuation signaling to accurate one or more actuation devices that are utilized to operate the recline release mechanism of a seatback in the seat. The actuation signaling from the controller may be send to a recline release system 240 controller, or may be routed directly to one or more servos 242, 244, actuators, solenoids, or the like, based on the state of the recline release button 214 on the inboard button unit 200. The one or more actuation devices receive an actuation signal and move a mechanical system to lease or lock a seatback recline cylinder. In some embodiments, the actuation devices may be servos, stepper motors, motors, solenoids or the like.

In the disclosed embodiment, there are two actuation devices, and both are servos 242, 244 which receive actuation signaling, based on the recline release button 214 being depressed on the inboard button board 210. When a signal is received from the controller 110, the servos 242 and 244 apply a pulling force to cables (not shown) which is then translated to one or more release levers for a seatback gas piston system (not shown). The one or more release levers may interact with one or more gas release buttons, for example, and allow the gas piston system to equalize internal pressure and the seatback of an associated seat to move. When the actuation signal to the servos 242 and 244 terminated, for example, as a result of a seat occupant releasing the recline release button 214 on the inboard button unit 200, the servos 242 and 244 return to their original position. The one or more release levers are disengaged from the gas release buttons, and the pressure in the gas piston system is maintained, preventing the seatback from repositioning.

Figure 2E:
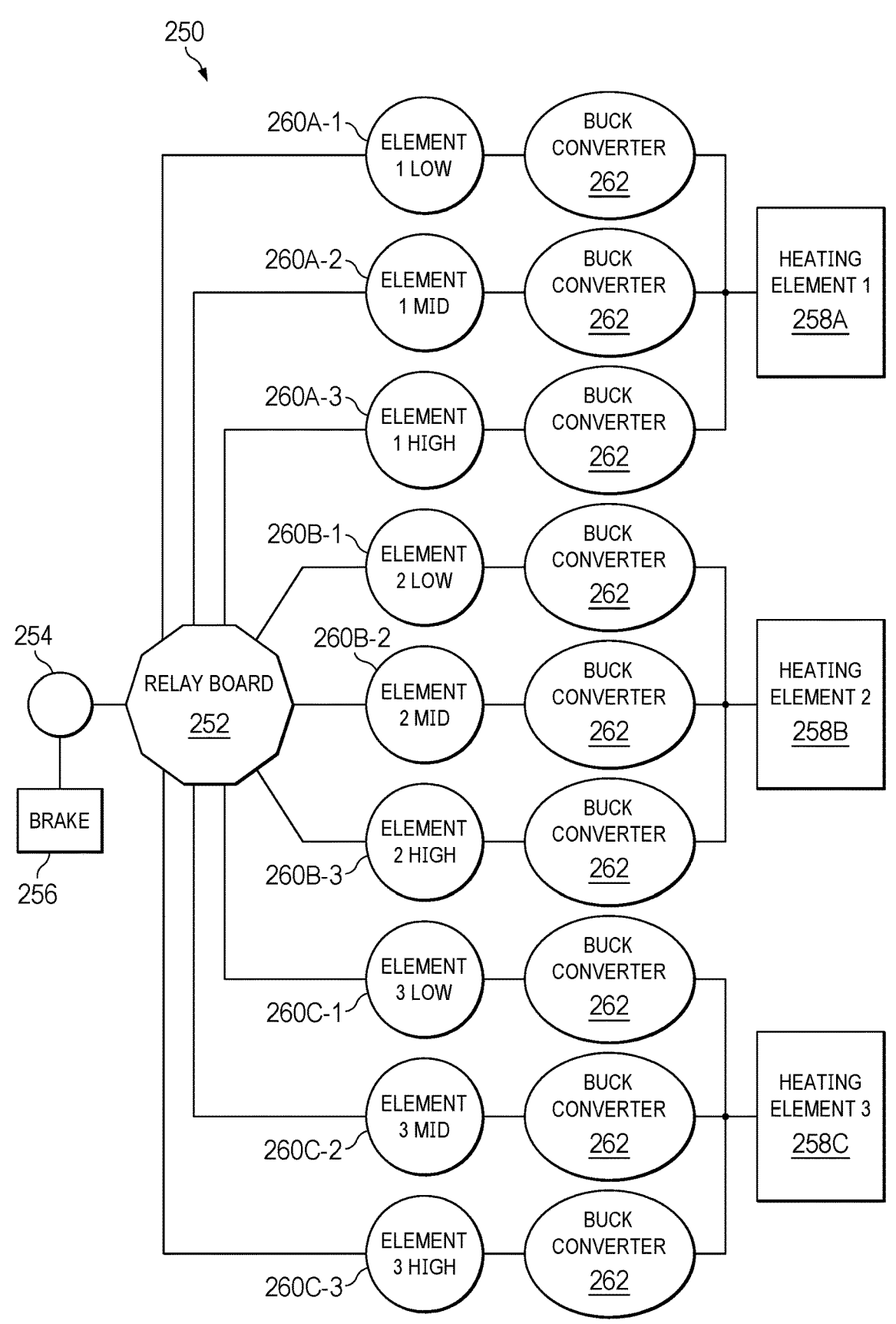

FIG. 2E is a block diagram of a relay controlled system 250 according to some embodiments. In some embodiments, the relay board 252 may control a heating system with one or more heating elements 258A-258C. In some embodiments, the system 250 has three heating elements 258A-C, which may be located in different positions throughout the seat. For example, there may be a seat pad heating element, a seatback heating element, and a leg rest heating element, or the like.

Each heating element 258A-258C may have a low power circuit, a medium power circuit, and high power circuit. The heating elements 258A-258C may be operated independently, and may have separate heat settings controlled by the controller in response to a user providing a heat setting indication through a button unit. In some embodiments, each low, medium, and high power circuit of each heating element 258A-258C may have an associated line from relay board 252 along which an element relay (260A-1 through 260C-3) and a buck converter 262 are configured in series. The power delivered to the heating elements 258A-258C is determined by which relay 260A1-260C3 is turned on, and each relay 260A1-260C3 may receive a control signal from the controller. For example, for heating element one 258A, low power relay 260A-1 is activated or deactivated based on input to the relay board 252 from the controller, which is based on input to the controller from heat button on the inboard button unit. When heating element one 258A low power relay 260A-1 is activated, power from the 28V DC power supply 115 flows through the relay board 252, low power relay 260A-1, and a buck converter 262 in series with low power relay 260A-1, to heating element one 258A.

The buck converter 262 serves to step down the DC voltage from the 28V DC power supply 115 to a suitable voltage for the level of heating desired in relation to heating element one 258A. The buck converter 262 in the path of low power relay 260A-1 outputs a lower power to heating element one 258A than the buck converter 262 in the path of medium power relay 260A-2, which, in turn, outputs a lower power than the buck converter 262 in the path of high power relay 260A-3. Heating element two 258B and heating element three 258C have similar arrangements with relays 260B-1-260C-3 and buck converters 262.

In some embodiments, the relay board 252 may also include a brake relay 254 that controls a brake 256. In some embodiments, the brake 256 may be a brake for a motor, such as the lumbar motor, leg rest motor, or the like.

Figure 3:
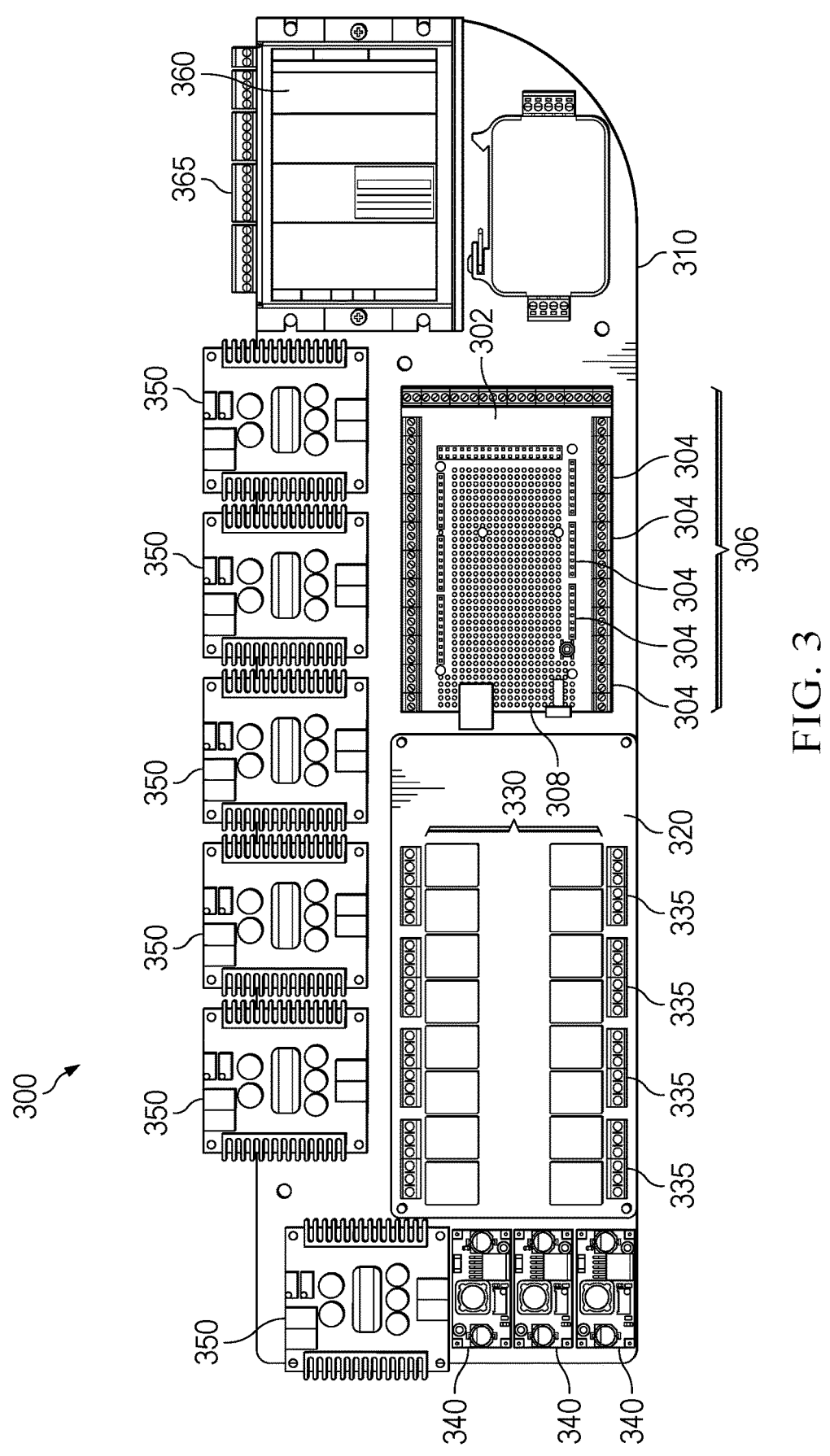
FIG. 3 is a diagram showing the control board for controlling various system modules according to some embodiments.

FIG. 3 is a diagram showing the control board 300 for controlling various system modules according to some embodiments. The control board 300 may have a mainboard, and a processing system 306 disposed on the mainboard 310. The mainboard 310 and processing system 306 have receptacles such as slots, plugs, pin headers, and the like, for connecting various modules. Further, the mainboard 310 may facilitate the electrical connections between the various system modules and the processing system 306. The mainboard 310 may include other modules and cabling in some embodiments, such as wired or wireless communication chips, power converters, or the like.

The processing system 306 may include a controller (not shown), with, for example, an expansion board 302 disposed over the controller and associated elements. The expansion board 302 may include connection pins 308, and one or more connectors 304 for connecting to the controller. The connectors 304 may be, for example, terminal blocks, pin headers, plugs, or the like that permit connection of wires or plugs to the controller for digital and analog inputs and outputs. Additionally, the controller may have more connectors, such as pin headers, solder pads, or the like, for connecting wires, cabling, plugs or the like, for digital or analog inputs and outputs. In some embodiments, the connectors 304 may be for serial bus outputs such as universal asynchronous receiver/transmitter (UART) protocol communication, serial peripheral interface (SPI) protocol communication, inter-integrated circuit (I2C, IIC) protocol communication, controller area network (CAN) bus, or another serial communication protocol.

In some embodiments, the mainboard 310 may further have module specific elements such as a motor controller 360 with motor control connections 365 for providing power or control signals to servos, motors or the like. The motor controller may be connected to the processing system 306 so that the processing system 306 causes the motor controller to control a motor connected to the motor controller 360 through the motor control connections 365. In some embodiments, the module specific elements on the mainboard 310 may be buck converters 340 for a heating system.

The mainboard 310 may also have a relay board 320 with a plurality of relays 330, and a plurality of relay connectors 335. The relay connectors 335 permit connection to elements such as heating elements of a heating system, a brake or the like. In some embodiments, the mainboard 310 may also have one or more voltage regulators 350. The voltage regulators 350 or buck converters 340 may provide regulated power at a desired voltage to elements on the mainboard 310, or to connected system module and subsystems. In other embodiments, the relays 330 may be solid state relays or other power electronic switching devices such as power transistors, switch mode power supplies, or the like. Additionally, in some embodiments, the relays 330 may selectively connect power from the voltage regulators 350 to connected modules in response to commands or signals from the controller or processing system 306.

In some embodiments, each seat in a vehicle may have a dedicated control board 300. In other embodiments, a row or a group of seats may share a control board 300, mainboard and/or controller. When options of the seat have been identified during production, or upgrades are made, the appropriate system modules may be connected to an appropriate receptacle in the control board 300. The system on the control board 300 may then automatically recognize the individual modules and make the feature functional on the seat once all requisite hardware has been installed. In some embodiments, a firmware or software upgrade to the controller 110 may be provided to enable the new functionality of the newly installed or upgraded modules. In some embodiments, each system module may identify itself, on for example, a bus, using a unique identifier for a particular type of device. In other embodiments, the control board and system module may perform a handshake to identify each other and negotiate operating parameters. In yet other embodiments, different connection ports on the control board 300 may be dedicated to each type of system module, and the control board 300 may assume that any system module connected to a particular set of communications ports is a type of system module associated with the particular communication ports.

Figure 4:
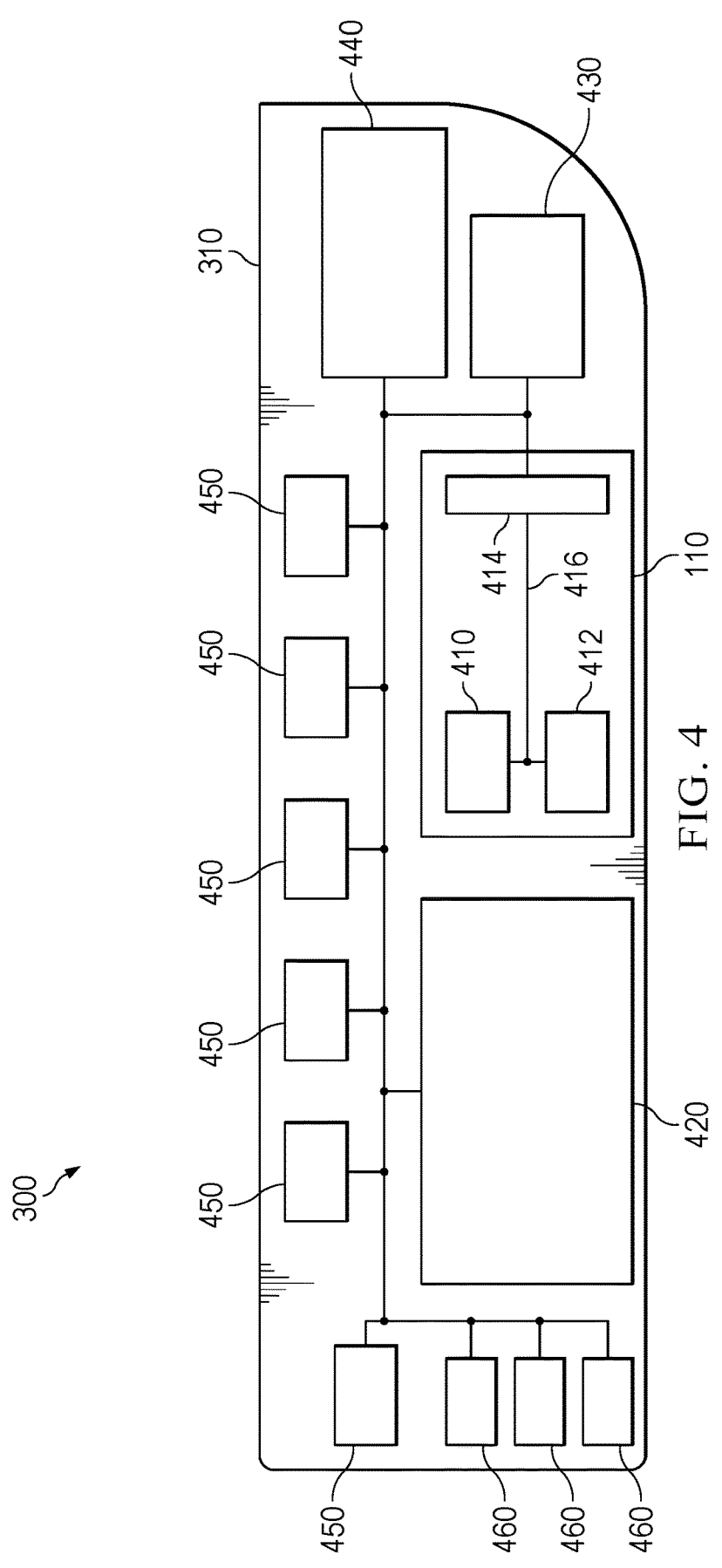
FIG. 4 is a block diagram of the control board according to some embodiments.

FIG. 4 is a block diagram of the control board 300 according to some embodiments. The processing system may have, for example, a controller with at least one processor 410, one or more memories 412, one or more communication busses 416, and a variety of external connections 414 for connection to, among other things, power supplies, input/output signaling, a ground plane, and the like.

The at least one processor 410 may be, for example, a microcontroller, central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The at least one processor 410 may implement or execute various example logical blocks, modules, and circuits described with reference to content disclosed herein. Alternatively, the processor 410 may be a combination of processors implementing a computing function, for example, a combination of one or more microcontrollers, microprocessors, or a combination of DSPs and microprocessors or microcontrollers.

The one or more memories 412 may store computer instructions for implementing the functions described herein, and in some embodiments, an operating system and program code for interacting with one or more of the modules attached to the mainboard 310. In some embodiments, all program code necessary to operate a range of potentially installed modules may be pre-loaded in the one or more memories 412 in order to avoid firmware or software updates when installing or upgrading a seat with new functional capabilities. However, in other embodiments, a firmware or software upgrade to the controller 110 may be required to fully enable the new functionality of newly installed or upgraded modules.

The memories 412 may be one or more memory elements be implemented in any type of volatile or non-volatile storage device or a combination thereof. For example, the memory 421 may include random access memory (RAM), read-only memory (ROM), static random access memory (SRAM), electrically erasable programmable read-only memory (EEPROM), erasable programmable read-only memory (EPROM), programmable read-only memory (PROM), magnetic memory, flash memory, magnetic disk, optical disc, or the like.

The mainboard 310 features a variety of features for powering and controlling connected system modules, and facilitating communication with the controller 110 and processor 410. The communications may be through a managed or unmanaged bus 470 on the mainboard 310. The bus 470 may include one or more electrical lines that connect components on the mainboard 310 to the controller 110 or processor 410. The controller 110 may handle sending and receiving communications using, for example, a master-slave communications protocol, or any other protocol supported by the controller 110. In other embodiments, processor communications between modules and the controller 110 may use cabling directly from a system module to the external connections of the controller 110. For example, the relay board 320 (shown in FIG. 3) may be connected to receptacle 420 as part of an installed heating system. Once all modules and connections necessary to implement the heating system in a seat are connected, the controller 110 may then automatically recognize the individual modules and make the feature functional on the seat. In some embodiments, a firmware or software upgrade to the controller 110 may be required to fully enable the new functionality of the newly installed or upgraded modules.

In some embodiments, the mainboard 310 may include one or more receptacles 420, 430, 440, 450, and 460 for installing features of the mainboard 310, and for providing communication though the mainboard 310 to the controller 110. For example, the mainboard may have regulator receptacles 450 that accept installation of voltage regulators so that the controller 110 may communicate over the bus 470 to control, for example, a voltage of a digitally controllable voltage regulator. Similarly, the mainboard 310 may include voltage converter receptacles 460 that accept installation of, for example, buck converters and that communicate with the controller 110 via the bus 470 so that the controller 310 can control activation or voltage levels of the installed buck controllers. In some embodiments, the mainboard 310 may have a relay receptacle 410 that accepts installation of a relay board with one or more relays, and that communicates with the controller 110 via the bus 470 so that the controller 110 is able to turn on each relay to turn on or off a voltage being controlled by the respective relay. Other receptacles, such as a motor control receptacle 440 or a general receptacle 430 may be disposed on the mainboard 310, and may be connected to the controller 110 via the bus 470 so that the controller can control or otherwise communicate with the components installed in the other receptacles 440, 430.

The receptacles of the mainboard 310 are designed to securely connect to system modules such that mechanical jarring, for example as occurring during turbulence or wave motion, will not dislodge the system modules from the mainboard 310. However, the receptacles may allow removal of system modules from the mainboard 310 without requiring solder removal or cutting. Additional fasteners, such as screws, clips, or the like, may be used to further secure the modules to the mainboard in some embodiments.

In other embodiments, receptacles may be mounting structures or regions on the mainboard 310 for attaching components, and the bus may be a cable based bus where wiring or cabling separate from the mainboard 310 connects the controller or processor 410 to installed components. For example, wires may be used to connect the processor 410, or sockets, pins, plugs, or the like on the controller 110 to the installed components.

Figure 5A:
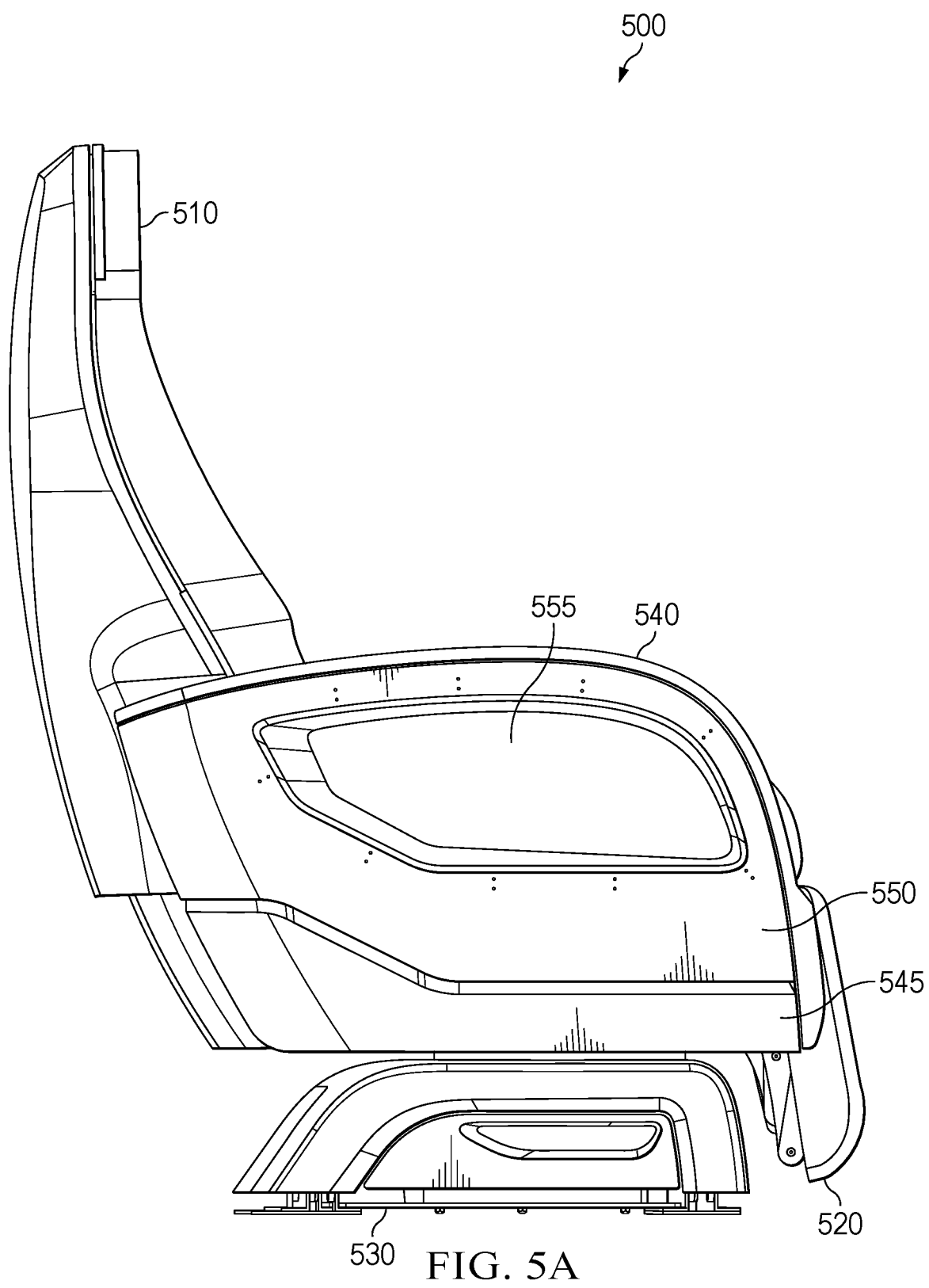
FIG. 5A is a diagram showing an aircraft seat according to some embodiments.

FIG. 5A is a diagram showing an aircraft seat 500 according to some embodiments. The seat 500 includes a seatback 510, a leg rest 520, a seat base 530 used to secure the seat 500 to the platform, and at least one armrest 540. In some embodiments, the armrest 540 includes an outer armrest panel 550 which has a removable panel 555 that can be removed to access the control board, controller and mainboard to install new modules, upgrade existing modules, or conduct diagnostic and repair activities on the control board and associated elements. In some embodiments, the removable panel 555 may be secured in an opening in the outer armrest panel 550 using magnets, by a friction fit, by clips, or the like. The outer armrest panel may be adjacent to a frame panel 545, and may provide sectional covering of internals of the seat 500 above the frame panel 545. In some embodiments, the control board may be disposed in the armrest 540 and covered by the removable panel 555 and the outer armrest panel 550. The control panel being dispose in the armrest 540 permits access to the control panel to access the control board without removing the seat 500 or performing significant disassembly of the seat 500, while avoiding interfering with the mechanics of the seat 500 or requiring additional dedicated space in the seat 500, and providing close proximity to the system modules that connect to the control board.

Figure 5B:
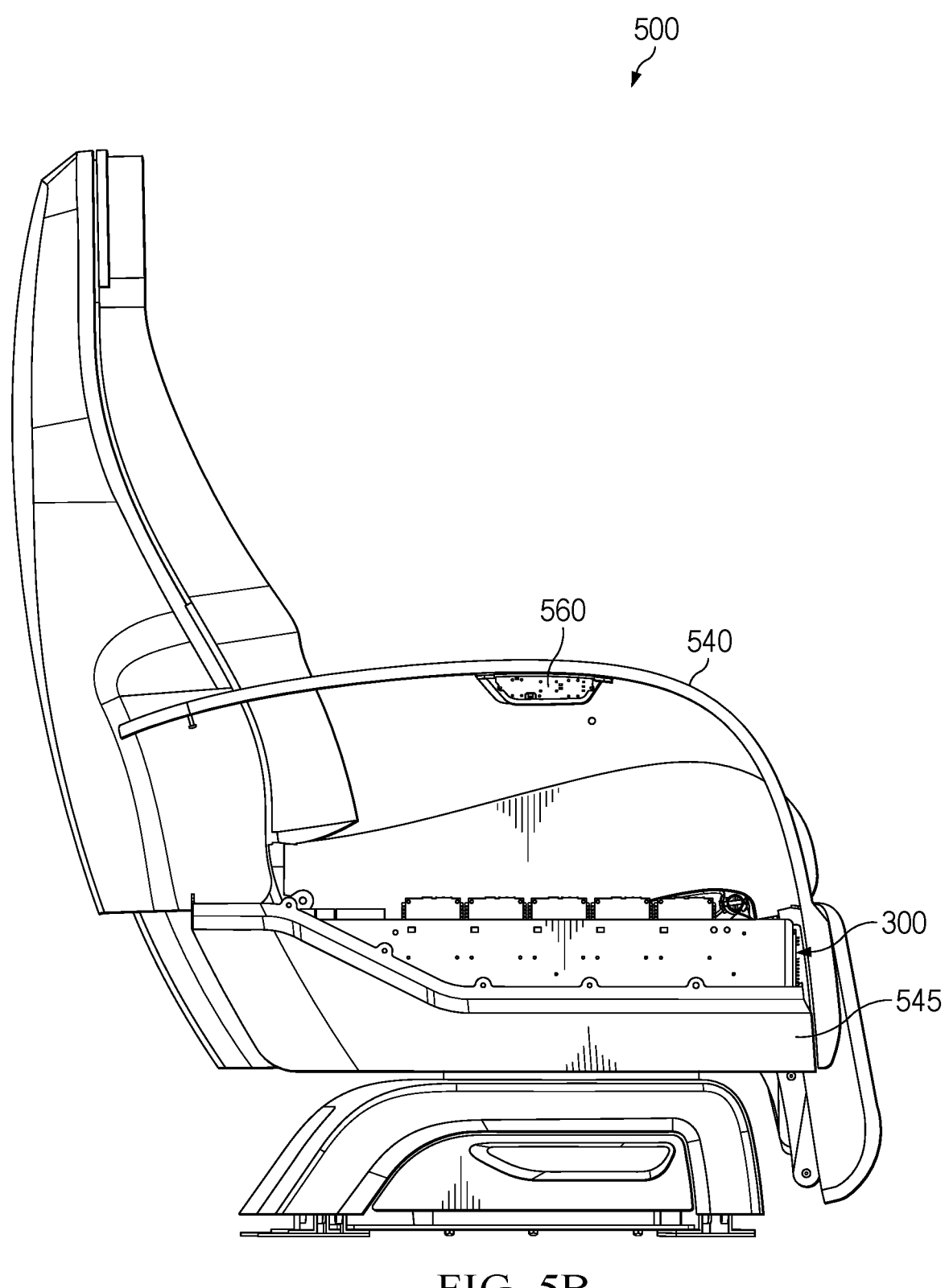
FIG. 5B is a diagram showing an internal view of an aircraft seat according to some embodiments.

FIG. 5B is a diagram showing an internal view of the aircraft seat 500 according to some embodiments. The aircraft seat is shown with the removable panel and outer armrest panel removed. The control board 300 may be mounted to the frame panel 545, or to a bracket, or other mounting point so that the control board 300 is at least partially behind or covered by the frame panel. In some embodiments, a button unit 560 installed in the armrest 540 with the back of the button unit 560 may be disposed inside the armrest 540. The location of the control board 300 in the armrest 540 also allows the control board 300 to be removed, if necessary, by removing a minimum number of fasteners.

Figure 5C:
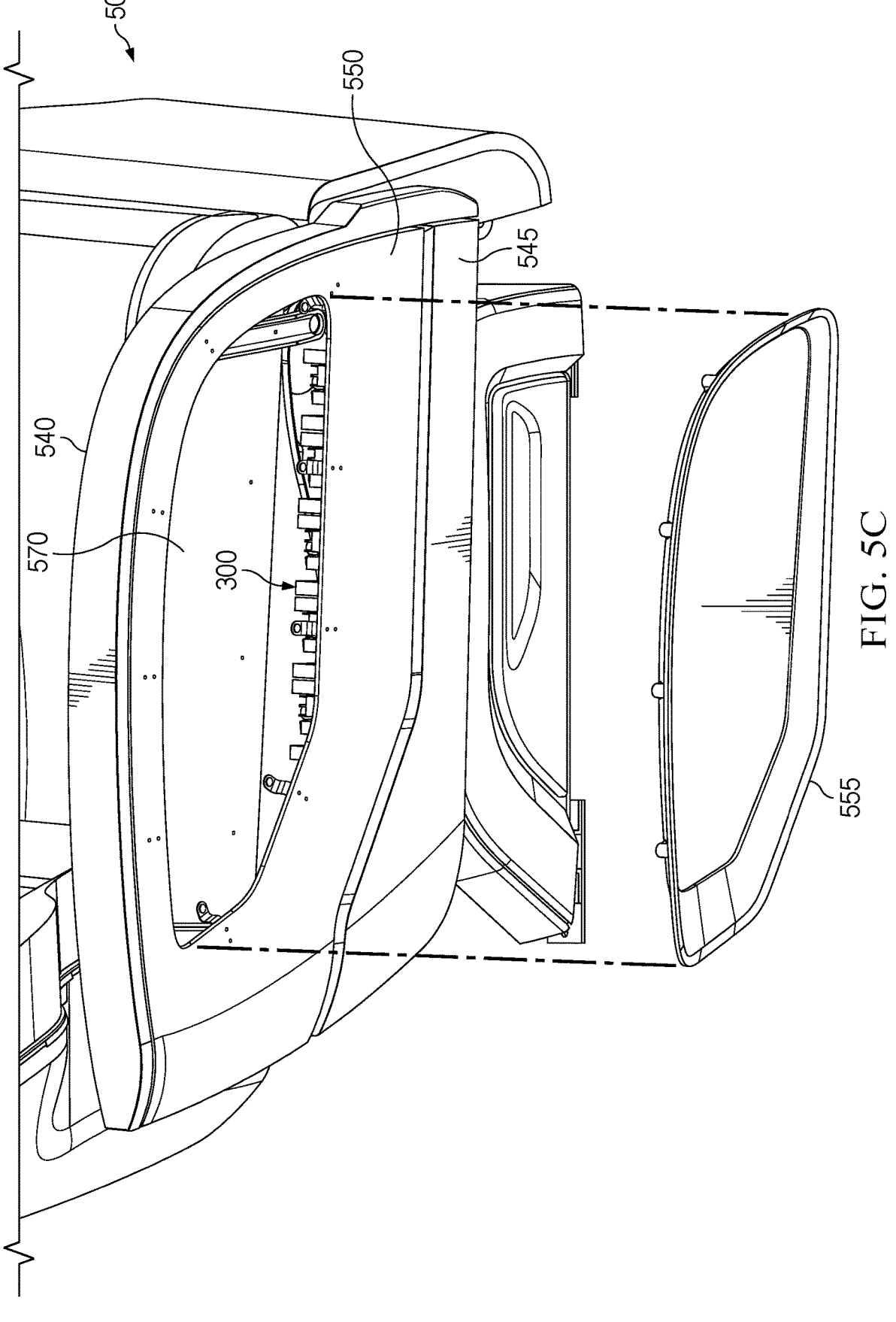
FIG. 5C is a diagram showing view of an aircraft seat with removable cover removed according to some embodiments.

FIG. 5C is a diagram showing view of an aircraft seat 500 with removable panel 555 removed according to some embodiments. The removable panel 555 may normally be disposed in an opening 570 of the outer armrest panel 550, and when removed, may permit access to the control board 300 through the opening 570. The control board 300 may be arranged vertically in the armrest 540 so that an edge of the control board 300 is adjacent to, or within, the opening 570. The particular arrangement and location of the control board 300 may be associated with the shape of the removable panel 555. For example, where the removable panel 555 is recessed or has a bezel creating a recess in the armrest 540, the control board may be arranged generally below the opening 570 so that the control board 300 clears the back of the removable panel 555 when the removable panel 555 is installed.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments of this application.

Functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computerreadable storage medium. Based on such an understanding, the technical solutions of this application essentially, or the part contributing to the conventional technology, or all or some of the technical solutions may be implemented in the form of a software product. The computer software product is stored in a storage medium and includes several instructions for indicating a computer device (which may be a personal computer, a server, a network device, or the like) to perform all or some of the steps of the method described in embodiments of this application. The foregoing storage medium includes any medium that can store program code, such as a USB flash drive, a removable hard disk, a read-only memory (ROM), a random access memory (RAM), a magnetic disk, or an optical disc.

All or some of the foregoing embodiments may be implemented by software, hardware, firmware, or any combination thereof. When software is used to implement embodiments, all or some of the embodiments may be implemented in a form of a computer program product. The computer program product includes one or more computer program instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computerreadable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

An embodiment seat control system includes a control board having a processing unit, where the processing unit has one more processors and one or more memories, and a mainboard. The processing unit is communicatively attached to the mainboard and mainboard has a plurality of receptacles and mainboard includes one or more communication buses between at least one of the plurality of receptacles and the processing unit. The system further has one or more system modules, where each module of the one or more system modules is configured to be connected to a respective receptacle of the plurality of receptacles, where each module of the one or more system modules implements a functional capability of a seat, and where the one or more system modules are nondestructively removeable from the mainboard.

In some embodiments, the one or more system modules include one or more of a seatback recline release system, a seat heating system, a leg rest positioning system, a seat swivel system, a seat inboard or outboard tracking system, or a lumbar system. In some embodiments, the system further has at least one of an inboard button unit or an outboard button unit communicatively connected to the control board, and where the at least one of the inboard button unit or the outboard button unit has one or more buttons is operable to send signaling to the control board, based on a seat occupant input, associated with operation of one or more functional capabilities of the seat. In some embodiments, the at least one of the inboard button unit or the outboard button unit has one or more LED indicators, and each of the one or more LED indicators relate to a position or status of a functional capability of the seat. In some embodiments, a system module of the one or more system modules is connected to the control board by a serial bus of the one or more communications buses. In some embodiments, the control board is disposed in an armrest of the seat. In some embodiments, the control board is disposed vertically in the armrest, and the armrest has a removable panel disposed in an opening adjacent to the control board, where the removable panel is attached to the armrest by magnets. In some embodiments, the control board is configured to control functional capabilities of two or more seats.

An embodiment seat includes a seat having armrests, a control board disposed in a first armrest of the armrests, the control board having a processing unit that includes one or more processors, at least one communication bus, and one or more memories, a mainboard, where the processing unit is communicatively attached to the mainboard, and the mainboard has a plurality of receptacles, and one or more system modules. Each module of the one or more system modules is disposed in a respective receptacle of the plurality of receptacles, each system module of the one or more system modules implements a functional capability of a seat, each system module of the one or more system modules is configured to communicate over the communications bus with the processing unit, and where the one or more system modules are non-destructively removeable from the mainboard. The system further has a power supply configured to supply power to the processing unit and to systems of the seat related to the one or more system modules.

In some embodiments, the system modules include one or more of a seatback recline release system, a seat heating system, a leg rest positioning system, a seat swivel system, a seat inboard or outboard tracking system, or a lumbar positioning system. In some embodiments, the seat includes at least one of an inboard button unit or an outboard button unit communicatively connected to the control board, where the at least one of the inboard button unit and the outboard button unit has one or more buttons is operable to send signaling to the control board, based on a seat occupant input, associated with operation of one or more functional capabilities of the seat, where the inboard button unit is located on an inboard armrest of the armrests, and where the outboard button unit is located on an outboard armrest of the armrests. In some embodiments, the at least one of the inboard button unit or the outboard button unit is communicatively connected to the control board by a wireless connection. In some embodiments, the at least one of the inboard button unit or the outboard button unit has one or more LED indicators, and where each of the one or more LED indicators relate to a position or status of a functional capability of the seat. In some embodiments, the control board further includes one or more voltage regulators connected to the processing unit. In some embodiments, the control board is disposed vertically in the first armrest, and the first armrest has a removable panel disposed in an opening adjacent to the control board, where the removable panel is attached to the armrest by magnets. In some embodiments, the control board is configured to control functional capabilities of the seat and another seat.

An embodiment seat control system includes a control board, having a processing unit having one or more processors, at least one communication bus, and one or more non-transitory computer readable memories storing program code for controlling a plurality of system modules installed in a seat to cause each system module of the system module to provide a functional capability of the seat, and a mainboard, where the processing unit is communicatively attached to the mainboard, and where the mainboard is configured to enable the processing unit to communicate with each system modules of the plurality of system modules. The seat control system further has the plurality of system modules, where each system module of the plurality of system modules is removably connected to, and in signal communication with, the mainboard, and where each system module is configured to provide a functional capability of the seat under of the processing unit, and a voltage regulator, connected to the mainboard, where the program code for controlling a plurality of system modules includes instructions that, when executed by the processor, cause the processor to control the voltage regulator to selectively control power to at least one system module of the plurality of system modules.

In some embodiments, the plurality of system modules comprises one or more of a seatback recline release system, a seat heating system, a leg rest positioning system, a seat swivel system, a seat inboard or outboard tracking system, or a lumbar system. In some embodiments, the seat includes at least one of an inboard button unit or an outboard button unit communicatively connected to the control board, where the at least one of the inboard button unit and the outboard button unit contain one or more buttons is operable to send signaling to the control board, based on a seat occupant input, associated with operation of one or more functional capabilities of the seat. In some embodiments, the control board is disposed vertically in an armrest, and the armrest has a removable panel disposed in an opening adjacent to the control board, where the removable panel is attached to the armrest by magnets.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A seat control system, comprising:

a control board comprising:

a processing unit, wherein the processing unit comprises one or more processors, and one or more memories; and a mainboard, wherein the processing unit is communicatively attached to the mainboard, wherein the mainboard has a plurality of receptacles, and wherein the mainboard includes one or more communication buses between at least one of the plurality of receptacles and the processing unit;

one or more system modules, wherein each module of the one or more system modules is configured to be connected to a respective receptacle of the plurality of receptacles, wherein each module of the one or more system modules implements a functional capability of a seat, wherein the one or more system modules are nondestructively removeable from the mainboard, and wherein at least a first module of the one or more system modules comprises a motor configured to move at least a portion of the seat; and at least one button unit communicatively connected to the control board;

wherein the processing unit is configured to automatically recognize each respective system module of the one or more system modules when the respective system module is installed by connecting the respective system module to a respective receptacle of the plurality of receptacles, wherein the processing unit being configured to automatically recognize each respective system module comprises the processing unit being configured to recognize each respective system module in response to at least one of the respective system module providing a unique identifier for a particular type of device, by the processing unit performing a handshake with the respective system module to identify the respective system module, or by the processing unit identifying a type of the respective system module according to a connection port to which the respective system module is connected; and wherein the processing unit is further configured to send, to the first module, signaling for control of the motor in response to an input to the at least one button unit by a user.

2. The system of claim 1, wherein the one or more system modules comprise one or more of a seatback recline release system, a seat heating system, a leg rest positioning system, a seat swivel system, a seat inboard or outboard tracking system, or a lumbar system.

3. The system of claim 1, wherein the at least one button unit comprises at least one of an inboard button unit or an outboard button unit, and wherein the at least one of the inboard button unit or the outboard button unit has one or more buttons is operable to send signaling to the control board, based on a seat occupant input, for operation of one or more functional capabilities of the seat.

4. The system of claim 3, wherein the at least one of the inboard button unit or the outboard button unit has one or more LED indicators for indicating a position or status of a functional capability of the seat.

5. The system of claim 1, wherein a system module of the one or more system modules is connected to the control board by a serial bus of the one or more communications buses.

6. The system of claim 1, wherein the control board is disposed in an armrest of the seat.

7. The system of claim 6, wherein the control board is disposed vertically in the armrest, and the armrest has a removable panel disposed in an opening adjacent to the control board, wherein the removable panel is attached to the armrest by magnets.

8. The system of claim 1, wherein the control board is configured to control functional capabilities of a two or more seats.

9. A seat system, comprising:

a seat structure, wherein the seat structure comprises armrests;

a control board disposed in a first armrest of the armrests, and wherein the control board comprises:

a processing unit, wherein the processing unit includes one or more processors, at least one communication bus, and one or more memories;

a mainboard, wherein the processing unit is communicatively attached to the mainboard, wherein the mainboard has a plurality of receptacles; and one or more system modules, wherein each module of the one or more system modules is disposed a respective receptacle of the plurality of receptacles, wherein each system module of the one or more system modules implements a functional capability of a seat, wherein each system module of the one or more system modules is configured to communicate over the communications bus with the processing unit, wherein the one or more system modules are non-destructively removeable from the mainboard, and wherein at least a first module of the one or more system modules comprises a motor configured to move at least a portion of the seat structure;

one or more systems disposed in the seat system and related to the one or more system modules;

a power supply configured to supply power to the processing unit and to the one or more systems of the seat system; and at least one button unit communicatively connected to the control board;

wherein the processing unit is configured to automatically recognize each respective system module of the one or more system modules when the respective system module is installed by connecting the respective system module to a respective receptacle of the plurality of receptacles, wherein the processing unit being configured to automatically recognize each respective system module comprises the processing unit being configured to recognize each respective system module in response to at least one of the respective system module providing a unique identifier for a particular type of device, by the processing unit performing a handshake with the respective system module to identify the respective system module, or by the processing unit identifying a type of the respective system module according to a connection port to which the respective system module is connected; and wherein the processing unit is further configured to send, to the first module, signaling for control of the motor in response to an input to the at least one button unit by a user.

10. The seat system of claim 9, wherein the one or more system modules comprise one or more of a seatback recline release system, a seat heating system, a leg rest positioning system, a seat swivel system, a seat inboard or outboard tracking system, or a lumbar positioning system.

11. The seat system of claim 9, wherein the at least one button unit comprises at least one of an inboard button unit or an outboard button unit, wherein the at least one of the inboard button unit and the outboard button unit has one or more buttons is operable to send signaling to the control board, based on a user input, for operation of one or more functional capabilities of the seat system, wherein the inboard button unit is located on an inboard armrest of the armrests, and wherein the outboard button unit is located on an outboard armrest of the armrests.

12. The seat of claim 11, wherein the at least one of the inboard button unit or the outboard button unit is communicatively connected to the control board by a wireless connection.

13. The seat system of claim 11, wherein the at least one of the inboard button unit or the outboard button unit has one or more LED indicators for indicating a position or status of a functional capability of the seat system.

14. The seat system of claim 9, wherein the control board further includes one or more voltage regulators connected to the processing unit.

15. The seat system of claim 9, wherein the control board is disposed vertically in the first armrest, and wherein the first armrest has a removable panel disposed in an opening adjacent to the control board, wherein the removable panel is attached to the armrest by magnets.

16. The seat system of claim 9, wherein the control board is configured to control functional capabilities of the seat system and another seat.

17. A seat control system, comprising:
a control board, comprising:
  a processing unit having one or more processors, at least one communication bus, and one or more non-transitory computer readable memories storing program code for controlling a plurality of system modules installed in a seat to cause each system module of the plurality of system modules to provide a functional capability of the seat; and
  a mainboard, wherein the processing unit is communicatively attached to the mainboard, and wherein the mainboard is configured to enable the processing unit to communicate with each system modules of the plurality of system modules;
the plurality of system modules, wherein each system module of the plurality of system modules is removably connected to, and in signal communication with, the mainboard, wherein each system module is configured to provide a functional capability of the seat under control of the processing unit, and wherein at least a first module of the plurality of system modules comprises a motor configured to move at least a portion of the seat;

a voltage regulator, connected to the mainboard, wherein the program code for controlling the plurality of system modules includes instructions that, when executed by the processor, cause the processor to control the voltage regulator to selectively control power to at least one system module of the plurality of system modules; and at least one button unit communicatively connected to the control board;

wherein the processing unit is configured to automatically recognize each respective system module of the plurality of system modules when the respective system module is installed by connecting the respective system module to the mainboard, and wherein the processing unit being configured to automatically recognize each respective system module comprises the processing unit being configured to recognize each respective system module in response to at least one of the respective system module providing a unique identifier for a particular type of device, by the processing unit performing a handshake with the respective system module to identify the respective system module, or by the processing unit identifying a type of the respective system module according to a connection port to which the respective system module is connected; and wherein the processing unit is further configured to send, to the first module, signaling associated with control of the motor in response to an input to the at least one button unit by a user.

18. The seat control system of claim 17, wherein the plurality of system modules comprises one or more of a seatback recline release system, a seat heating system, a leg rest positioning system, a seat swivel system, a seat inboard or outboard tracking system, or a lumbar system.

19. The seat control system of claim 17, wherein the at least one button unit comprises at least one of an inboard button unit or an outboard button unit, wherein the at least one of the inboard button unit and the outboard button unit has one or more buttons is operable to send signaling to the control board, based on a seat occupant input, associated with operation of one or more functional capabilities of the seat.

20. The seat control system of claim 17, wherein the control board is disposed vertically in an armrest, and the armrest has a removable panel disposed in an opening adjacent to the control board, wherein the removable panel is attached to the armrest by magnets.

* * * * *